(12) United States Patent
Chiang

(10) Patent No.: US 7,736,162 B1
(45) Date of Patent: Jun. 15, 2010

(54) CARD CONNECTOR

(75) Inventor: Shu-Man Chiang, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 12/485,043

(22) Filed: Jun. 16, 2009

(51) Int. Cl.
*H01R 13/62* (2006.01)

(52) U.S. Cl. ..................................................... 439/159

(58) Field of Classification Search ............... 439/159, 439/160, 630; 235/441
See application file for complete search history.

(56) References Cited

U.S. PATENT DOCUMENTS 6,767,232 B1 * 7/2004 Tien ........................... 439/159

* cited by examiner

Primary Examiner—Javaid Nasri

(57) ABSTRACT

A card connector includes an insulating housing defining a receiving chamber for receiving a card having a gap at one side edge, an ejecting device for withdrawing the card from the card connector and including a sliding body, and a cover coupled on the insulating housing. One side of the receiving chamber defines a sliding recess where the sliding body is slidably disposed. The sliding body protrudes toward the receiving chamber to form a projection buckled into the gap of the card for securing the card. The cover is provided with a propping means at one side away from the ejecting device. The propping means includes a propping arm stretching into the receiving chamber and inclined toward the ejecting device for propping against the other side edge of the card to make the card close to the sliding body and further secure the projection in the gap.

6 Claims, 3 Drawing Sheets

CARD CONNECTOR

BACKGROUND OF THE INVENTION

1. Field of the Invention

The present invention generally relates to a card connector for receiving a card therein, and more particularly to a card connector capable of preventing the card from springing out in the process of withdrawing the card from the card connector.

2. The Related Art

Traditionally, a card connector has an ejecting device used for withdrawing an external card from the card connector. The ejecting device includes a sliding body, a spring and a connecting bar. While the card is inserted into the card connector, the card pushes the sliding body to move. Then the spring is compressed and the connecting bar jostles the sliding body to keep the sliding body and the spring relatively immovable. While the card is withdrawn from the card connector, the card is again pushed inward to make the sliding body discharged from the connecting bar. As a result, the power stored in the spring is released so that drives the spring to reposition and further drives the sliding body to reposition. So the sliding body pushes the card to exit from the card connector.

However, in the process of withdrawing the card from the card connector, the card is apt to spring out from the card connector without any resisting structures for cushioning the speed of the card moving outward under the action of the ejecting device, as a result, the card may be lost or damaged. Therefore, a card connector capable of preventing the card from springing out is required.

SUMMARY OF THE INVENTION

An object of the present invention is to provide a card connector adapted for receiving an external card having a gap at one side edge thereof. The card connector includes an insulating housing defining a receiving chamber penetrating through a top and a front thereof for receiving the card therein, a plurality of terminals disposed in the insulating housing and stretching into the receiving chamber for electrically contacting the card, an ejecting device used for withdrawing the card from the card connector, and a cover coupled on the insulating housing. One side of the receiving chamber defines a sliding recess adjacent to one sidewall of the receiving chamber. The ejecting device includes a sliding body slidably disposed in the sliding recess. The sliding body protrudes toward the receiving chamber to form a projection buckled into the gap of the card for securing the card. The cover is provided with a propping means at one side away from the ejecting device. The propping means includes a propping arm stretching rearward into the receiving chamber and inclined toward the ejecting device, and a connecting arm connecting the propping arm with the cover. The propping arm props against the other side edge of the card to make the card stay close to the sliding body and further secure the projection in the gap.

As described above, the propping arm of the propping means presses one side edge of the card to make the other side edge of the card stay close to the ejecting device that further makes the projection tightly buckled in the gap so that prevents the card from springing out unexpectedly while withdrawing the card from the card connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 2:
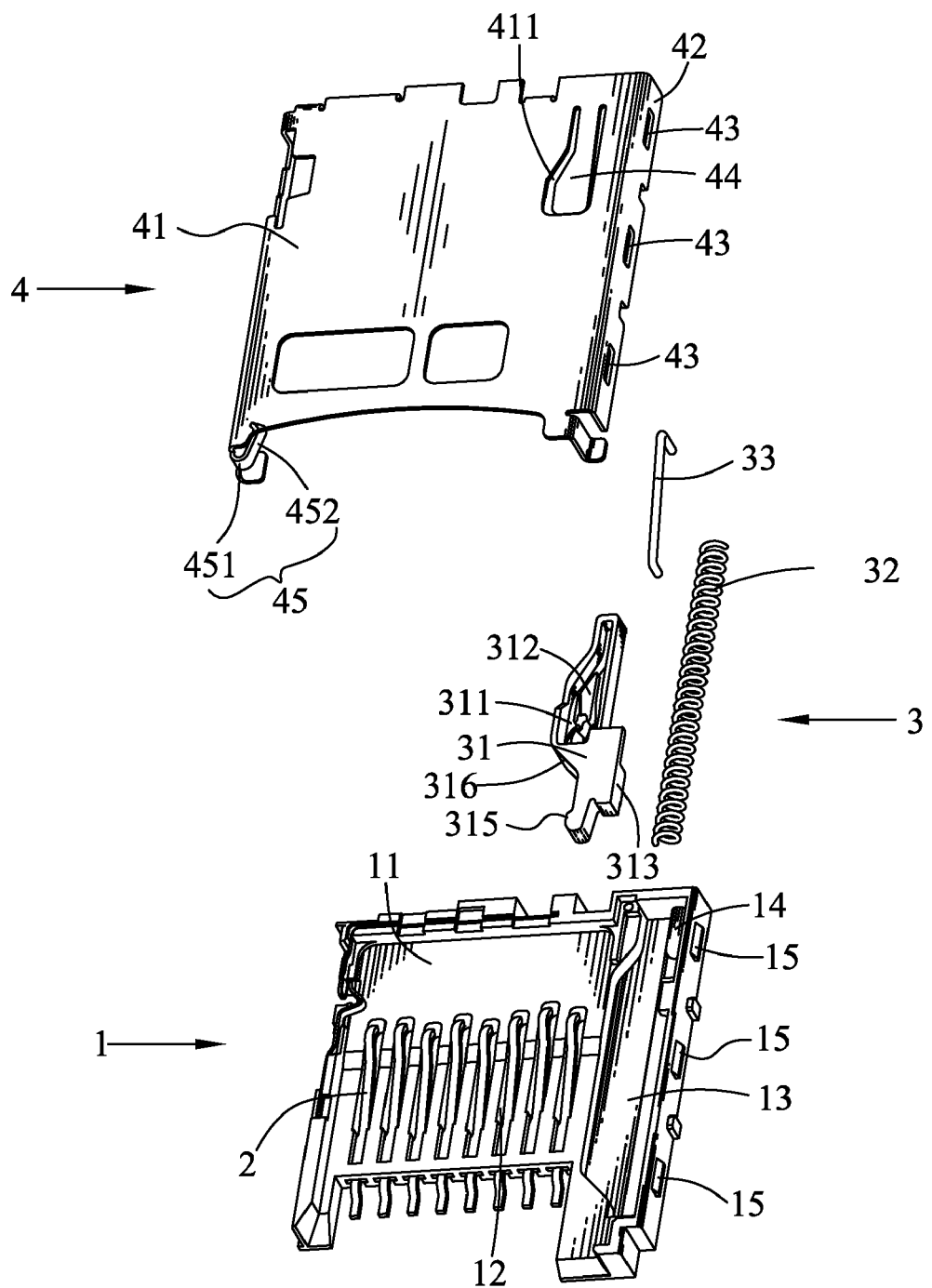
FIG. 2 is an exploded view of the card connector of FIG. 1.

With reference to FIG. 2, a card connector according to the present invention includes an insulating housing 1, a plurality of terminals 2, an ejecting device 3 and a cover 4.

In FIG. 2, the insulating housing 1 is of flat rectangular shape and defines a rectangular receiving chamber 11 penetrating through a top and a front thereof. The insulating housing 1 further defines a plurality of longitudinal terminal cavities 12 arranged at regular intervals along a transverse direction thereof and communicating with a bottom of the receiving chamber 11. One side of the receiving chamber 11 is further concaved downward to form a longitudinal sliding recess 13 adjacent to one sidewall of the receiving chamber 11. A rear wall of the sliding recess 13 protrudes forward to form a retaining rod 14 located in the sliding recess 13 and adjacent to the corresponding sidewall. Two opposite outsides of the insulating housing 1 respectively protrude outward to form a plurality of fixing lumps 15. The terminals 2 are located in the respective terminal cavities 12 of the insulating housing 1 and stretch into the receiving chamber 11.

Figure 3:
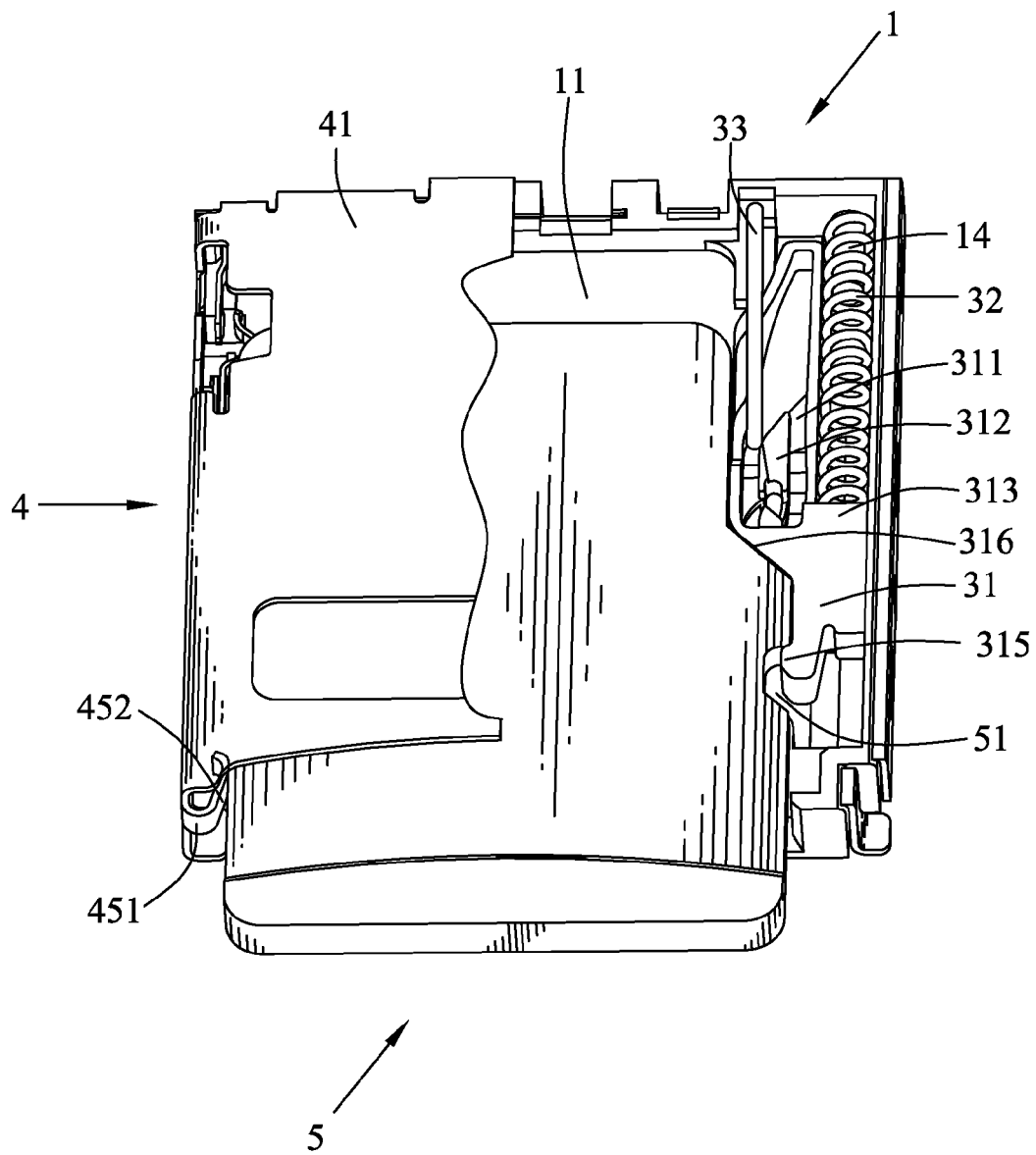
FIG. 3 is a perspective view of the card connector with a partial cover, in which the card is inserted.

Referring to FIG. 2 and FIG. 3, the ejecting device 3 includes a sliding body 31, a spring 32 and a connecting bar 33. The sliding body 31 extends longitudinally and defines a trace cavity 311 at a top thereof. A trace shoulder 312 is defined in the trace cavity 311 and located apart from the inside of the trace cavity 311. One side edge of the sliding body 31 protrudes sideward to form a step portion 313 at a front thereof. A front end of the sliding body 31 protrudes opposite to the step portion 313 to form a projection 315. A pushing portion 316 is provided to smoothly connect the other side edge of the sliding body 31 and the front of the sliding body 31 and spaced from the projection 315. The sliding body 31 is movably disposed in the sliding recess 13 of the insulating housing 1 and the projection 315 faces the receiving chamber 11. One end of the spring 32 is worn around the retaining rod 14 and the other end thereof is against the step portion 313. One end of the connecting bar 33 is fastened in the insulating housing 1, and the other end thereof is slidably located in the trace cavity 311 of the sliding body 31 for collaborating with the trace shoulder 312 to realize the inserting and ejecting card.

Figure 1:
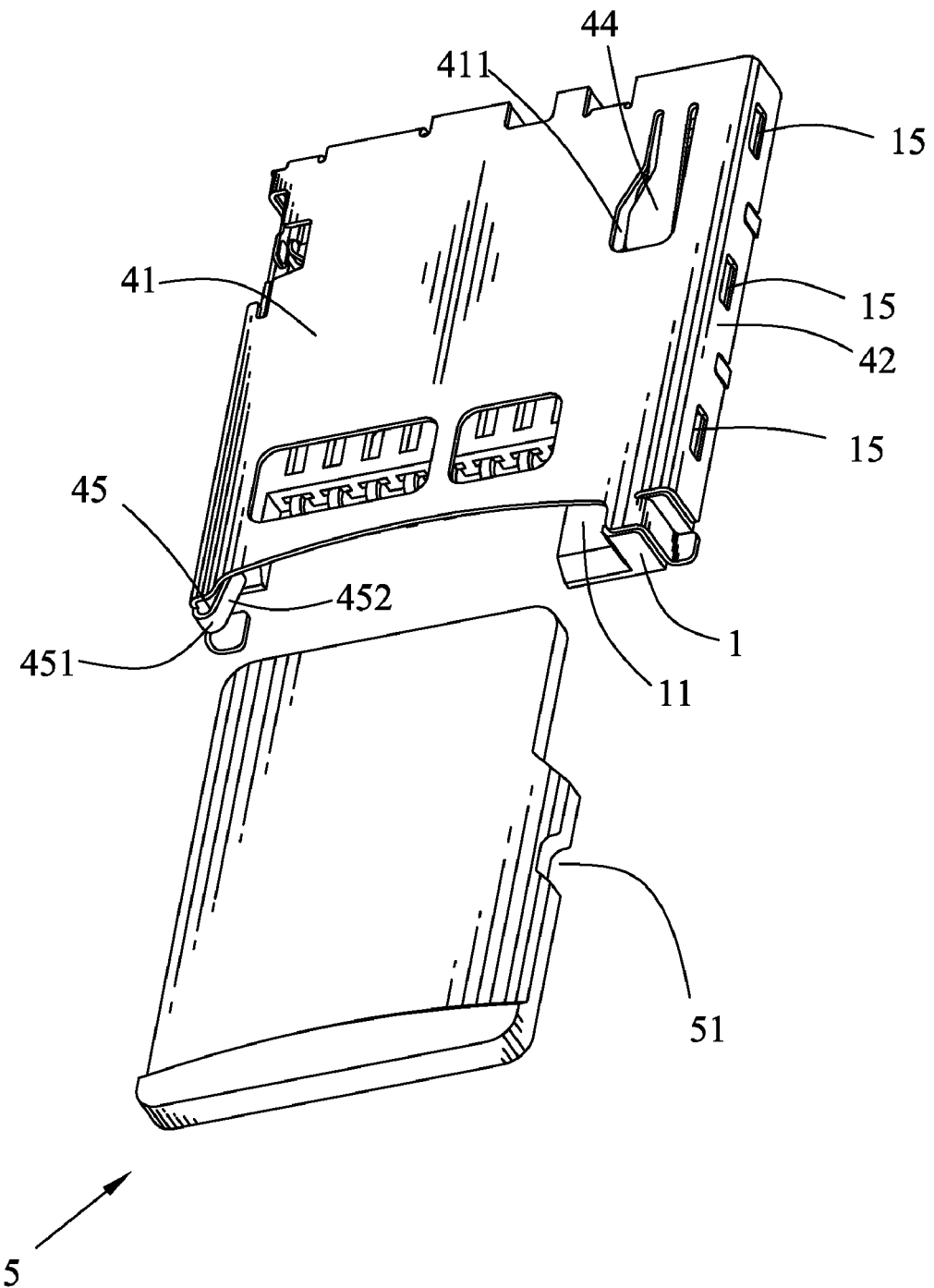
FIG. 1 is a respective perspective view of a card connector and an external card according to the present invention.

Referring to FIG. 1 and FIG. 2, the cover 4 is coupled on the insulating housing 1 and has a flat rectangular base plate 41 covered on the receiving chamber 11 and two side plates 42 which are bent downward from both opposite side edges of the base plate 41. Each of the side plates 42 defines a plurality of fixing apertures 43 for buckling the corresponding fixing lumps 15 of the insulating housing 1 therein so as to ensure a firm engagement of the insulating housing 1 and the cover 4. One side of the base plate 41 defines an opening 411 above the ejecting device 3. A rear edge of the opening 411 extends forward and is inclined downward to form a restraining slice 44 against the connecting bar 33 for restraining the connecting bar 33 to steadily slide in the trace cavity 311. The side plate 42 far away from the ejecting device 3 is provided with a propping means 45. The propping means 45 includes an arched connecting arm 451 extended from a front edge of the side plate 42 and having a mouth facing the receiving chamber 11, and a propping arm 452 extended rearward from a free end of the connecting arm 451 and inclined toward the ejecting device 3. A free end of the propping arm 452 is bent opposite to the ejecting device 3. The propping arm 452 stretches into the receiving chamber 11.

Referring to FIG. 1 and FIG. 3, while an external card 5 which has a gap 51 at one side edge thereof is inserted into the card connector, the propping arm 452 of the propping means 45 guides the card 5 to facilitate the card 5 to be inserted into the receiving chamber 11, and then the projection 315 of the sliding body 31 is buckled into the gap 51 to secure the card 5 with the slide body 31. Furthermore, the propping arm 452 is compressed sideward by the card 5 to generate a pushing force. The pushing force makes the propping arm 452 to elastically prop against the other side edge of the card 5. Therefore, the propping arm 452 pushes the card 5 to make the card 5 stay close to the ejecting device 3 and further secure the projection 315 in the gap 51 tightly. Then the movement of the card 5 drives the sliding body 31 to slide along the sliding recess 14 by pushing the pushing portion 316 that makes the spring 32 compressed and the connecting bar 33 to slide along the trace cavity 311. When the connecting bar 33 is blocked by the shoulder 312 in the trace cavity 311, the electric module of the card 5 just contacts the terminals 2 electrically.

While the card 5 is withdrawn from the card connector, the card 5 obtains a rearward push force again until the connecting bar 33 departs from the trace shoulder 312 of the sliding body 31 and re-slides into the trace cavity 311. At this moment, the power stored in the spring 32 is released that pushes the sliding body 31 to move forward. The movement of the sliding body 31 drives the card 5 to move outward by means of the pushing portion 316. So the card 5 is taken out of the receiving chamber 11 of the card connector. In the process of withdrawing the card 5 from the receiving chamber 11, the compression of the propping arm 452 to the card 5 makes the projection 315 tightly buckled in the gap 51 so that prevents the card 5 from springing out unexpectedly by the ejecting device 3.

As described above, the propping arm 452 of the propping means 45 can guide the card 5 to be easily inserted into the card connector while inserting the card 5, and furthermore, the propping arm 452 presses one side edge of the card 5 to make the other side edge of the card 5 stay close to the ejecting device 3 that further makes the projection 315 tightly buckled in the gap 51 so that prevents the card 5 from springing out unexpectedly while withdrawing the card 5 from the card connector.

What is claimed is:

1. A card connector adapted for receiving an external card having a gap at one side edge thereof, comprising:
    an insulating housing defining a receiving chamber penetrating through a top and a front thereof for receiving the card therein, one side of the receiving chamber defining a sliding recess;
    a plurality of terminals disposed in the insulating housing and stretching into the receiving chamber for electrically contacting the card;
    an ejecting device used for withdrawing the card from the card connector and including a sliding body slidably disposed in the sliding recess, the sliding body protruding toward the receiving chamber to form a projection buckled into the gap of the card for securing the card; and
    a cover coupled on the insulating housing and provided with a propping means at one side away from the ejecting device, the propping means including a propping arm stretching rearward into the receiving chamber and inclined toward the ejecting device, and a connecting arm connecting the propping arm with the cover, the propping arm propping against the other side edge of the card to make the card stay close to the sliding body and further secure the projection in the gap.

2. The card connector as claimed in claim 1, wherein the cover has a base plate and two side plates bent downward from both opposite side edges of the base plate, the propping means is defined at one side plate away from the ejecting device, the connecting arm is bent inward from a front edge of the side plate, and a free end of the propping arm is bent opposite to the ejecting device.

3. The card connector as claimed in claim 1, wherein the sliding body of the ejecting device defines a trace cavity at a top thereof and a trace shoulder is provided in the trace cavity and located apart from the inside of the trace cavity, the ejecting device further includes a spring and a connecting bar, the spring is located between a rear wall of the sliding recess and the sliding body, one end of the connecting bar is fastened in the insulating housing and the other end is slidably located in the trace cavity of the sliding body to collaborate with the trace shoulder.

4. The card connector as claimed in claim 3, wherein the sliding body protrudes opposite to the receiving chamber to form a step portion, the rear wall of the sliding recess protrudes forward to form a retaining rod, one end of the spring is worn around the retaining rod and the other end is against the step portion.

5. The card connector as claimed in claim 3, wherein the cover has a base plate covered on the receiving chamber, one side of the base plate defines an opening above the ejecting device, a rear edge of the opening extends forward and is inclined downward to form a restraining slice against the connecting bar of the ejecting device for restraining the connecting bar to slide in the trace cavity.

6. The card connector as claimed in claim 1, wherein a pushing portion is provided at the same side of the sliding body with the projection and spaced from the projection.

* * * * *